United States Patent
Oh et al.

(10) Patent No.: US 7,799,445 B2
(45) Date of Patent: Sep. 21, 2010

(54) PERPENDICULAR MAGNETIC RECORDING MEDIA WITH SOFT MAGNETIC UNDERLAYER

(75) Inventors: Hoon-sang Oh, Seongnam-si (KR); Yong-su Kim, Seoul (KR); No-yeol Park, Seongnam-si (KR); Hoo-san Lee, Osan-si (KR); Chul-min Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 911 days.

(21) Appl. No.: 11/477,624

(22) Filed: Jun. 30, 2006

(65) Prior Publication Data

US 2007/0003795 A1    Jan. 4, 2007

(30) Foreign Application Priority Data

Jun. 30, 2005    (KR) .................... 10-2005-0058643

(51) Int. Cl.
*G11B 5/66* (2006.01)
(52) U.S. Cl. .................... 428/828.1; 428/829; 428/830
(58) Field of Classification Search .................... None
See application file for complete search history.

(56) References Cited

U.S. PATENT DOCUMENTS

2004/0062953 A1* 4/2004 Futamoto et al. ....... 428/694 TS
2004/0234818 A1* 11/2004 Tanahashi et al. ..... 428/694 TM
2005/0129985 A1* 6/2005 Oh et al. ................ 428/694 TS

FOREIGN PATENT DOCUMENTS

| JP | 2000-040209 A | 2/2000 |
|----|---------------|--------|
| JP | 2001-155321 A | 6/2001 |
| JP | 2001-155322 A | 6/2001 |
| JP | 2002-092843 A | 3/2002 |
| JP | 2004-079058 A | 3/2004 |
| JP | 2004-118894 A | 4/2004 |
| JP | 2004-146015 A | 5/2004 |
| JP | 2004-272957 A | 9/2004 |
| JP | 2004-348777 A | 12/2004 |

* cited by examiner

*Primary Examiner*—Kevin M Bernatz
(74) *Attorney, Agent, or Firm*—Sughrue Mion, PLLC (57) ABSTRACT

A perpendicular magnetic recording medium including a soft magnetic underlayer. The perpendicular magnetic recording medium includes: a lower structural body including an anti-ferromagnetic layer; a first soft magnetic underlayer, a non-magnetic layer, and a second soft magnetic underlayer sequentially formed on the anti-ferromagnetic layer, where the thickness ratio of the second soft magnetic underlayer to that of the first soft magnetic underlayer is designed to be within specific range; and a recording layer formed on the second soft magnetic underlayer. Therefore, noise generated on the soft magnetic underlayer due to external magnetic fields of a magnetic head and a voice coil motor can be reduced greatly.

10 Claims, 10 Drawing Sheets

PERPENDICULAR MAGNETIC RECORDING MEDIA WITH SOFT MAGNETIC UNDERLAYER

CROSS-REFERENCE TO RELATED PATENT APPLICATIONS

This application claims priority from Korean Patent Application No. 10-2005-0058643, filed on Jun. 30, 2005, in the Korean Intellectual Property Office, the disclosure of which is incorporated herein in its entirety by reference.

BACKGROUND OF THE INVENTION

1. Field of the Invention

The present invention relates to perpendicular magnetic recording media, and more particularly, to perpendicular magnetic recording media with a soft magnetic underlayer, a thickness and a structure of which are controlled to reduce noises.

2. Description of the Related Art

Recently, demands for recording media having larger areal recording density are rapidly being increased according to an increase of demands for magnetic disk devices. Conventionally, the magnetic recording media records data horizontally, however, a perpendicular magnetic recording method has been proposed to increase the areal recording density of the magnetic disk device. The perpendicular magnetic recording method magnetizes a magnetic recording layer, on which data is recorded, perpendicularly. The magnetic recording layer for such a perpendicular magnetization uses a magnetic material that can display relatively high magnetic anisotropy and coercivity.

Figure 1:
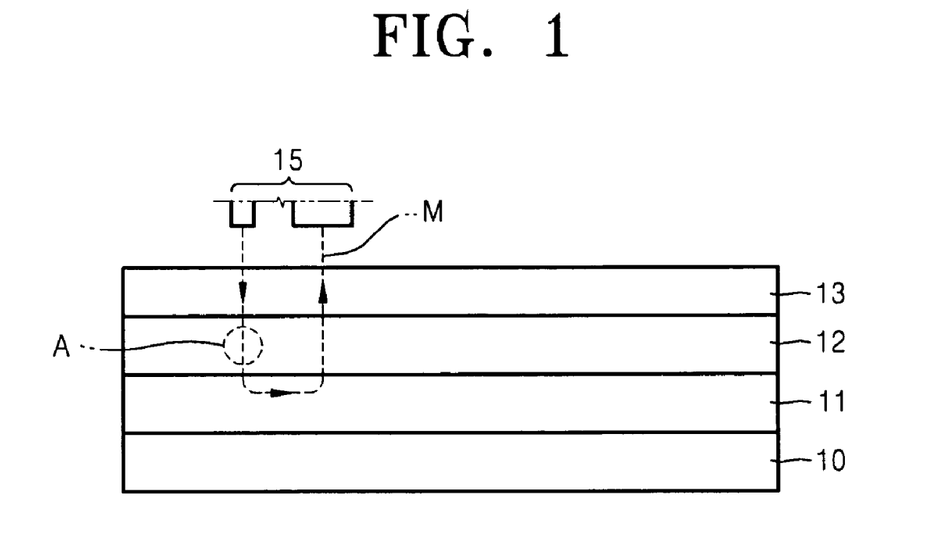
FIG. 1 is a schematic cross-sectional view of a perpendicular magnetic recording device according to the related art.

FIG. 1 is a schematic cross-sectional view of a perpendicular magnetic recording device according to the related art. The perpendicular magnetic recording device includes a perpendicular magnetic recording medium and a magnetic head.

Referring to FIG. 1, the related perpendicular magnetic recording medium includes a soft magnetic underlayer 11, a recording layer 12, and a protective layer 13 that are sequentially formed on a substrate 10. An intermediate layer (not shown) may be further formed between the soft magnetic underlayer 11 and the recording layer 12. A magnetic head 15 is located above the perpendicular magnetic recording medium, and the magnetic head 15 includes a main pole and a return pole. The soft magnetic underlayer 11 is provided under the recording layer 12 in order to magnetize part A of the recording layer 12 efficiently and make writing of data easier.

The magnetic head applies a magnetic flux (M) to the recording layer 12 to magnetize the recording layer 12 and write the data. In more detail, when writing the data, the magnetic flux M discharged from the main pole magnetizes the recording layer 12 in a bit region unit, flows along the soft magnetic underlayer 11 under the recording layer 12, and then, returns to the return pole. Since a density of the magnetic flux discharged from the main pole is effectively transferred to the recording layer 12 without fluctuating, the recording layer 12 is more effectively magnetized by such a magnetic flux.

In the case of introducing such a soft magnetic underlayer 11, a saturation of the soft magnetic underlayer 11 should first be considered. To effectively prevent the saturation of the soft magnetic underlayer 11, the soft magnetic underlayer 11 should have a sufficient thickness and have a sufficient saturation magnetization of SUL ($M_S$).

However, the thick soft magnetic underlayer 11 can result in serious magnetic domain noise. In addition, since the related soft magnetic underlayer 11 has a thickness of 100 nm or more, fabrication costs increase and a yield is degraded. In addition, in cases of recording data onto the recording layer 12 or reproducing the recorded data, noises may be generated on the soft magnetic underlayer 12 due to a stray field that is unintentionally generated by the magnetic head and a voice coil motor, and thereby, badly affecting the characteristics of the perpendicular magnetic recording media.

SUMMARY OF THE INVENTION

The present invention provides a perpendicular magnetic recording medium including a soft magnetic underlayer that can reduce spike noises accompanied when the soft magnetic underlayer is introduced and reduce media noises caused by a stray field of a magnetic head and a voice coil motor.

According to an aspect of the present invention, there is provided a perpendicular magnetic recording medium including: a lower structural body including an anti-ferromagnetic layer; a first soft magnetic underlayer, a non-magnetic layer, and a second soft magnetic underlayer sequentially formed on the anti-ferromagnetic layer; and a recording layer formed on the second soft magnetic underlayer.

A thickness (d1) of the second soft magnetic underlayer may be approximately 30% through 50% of a sum of a thickness (d2) of the first soft magnetic underlayer and the thickness (d1) of the second soft magnetic underlayer.

The sum of the thickness (d2) of the first soft magnetic underlayer and the thickness (d1) of the second soft magnetic underlayer may range from 30 nm to 80 nm.

The lower structural body may include: a substrate, a seed layer, a buffer layer, and an anti-ferromagnetic layer that are sequentially formed on the substrate.

The second soft magnetic underlayer is thinner than the first soft magnetic underlayer that is located at lower portion.

The non-magnetic layer may include one or more selected from the group consisting of Cu, Ru, Rh, Re, Pd, and Pt.

The ratio of $M_s t$ of top soft magnetic underlayer (the second soft magnetic underlayer) to that of bottom soft magnetic underlayer (the first soft magnetic underlayer) ranges from 0.4 to 0.8 when $M_s$ value (saturation magnetization value) of a material forming the first soft magnetic underlayer or the second soft magnetic underlayer ranges from 1000 to 1500 emu/cc.

The ratio of $M_s t$ of top soft magnetic underlayer (the second soft magnetic underlayer) to that of bottom soft magnetic underlayer (the first soft magnetic underlayer) ranges from 0.6 to 1.0 when $M_s$ value (saturation magnetization value) of a material forming the first soft magnetic underlayer or the second soft magnetic underlayer ranges from 1600 to 2000 emu/cc.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Figure 2:
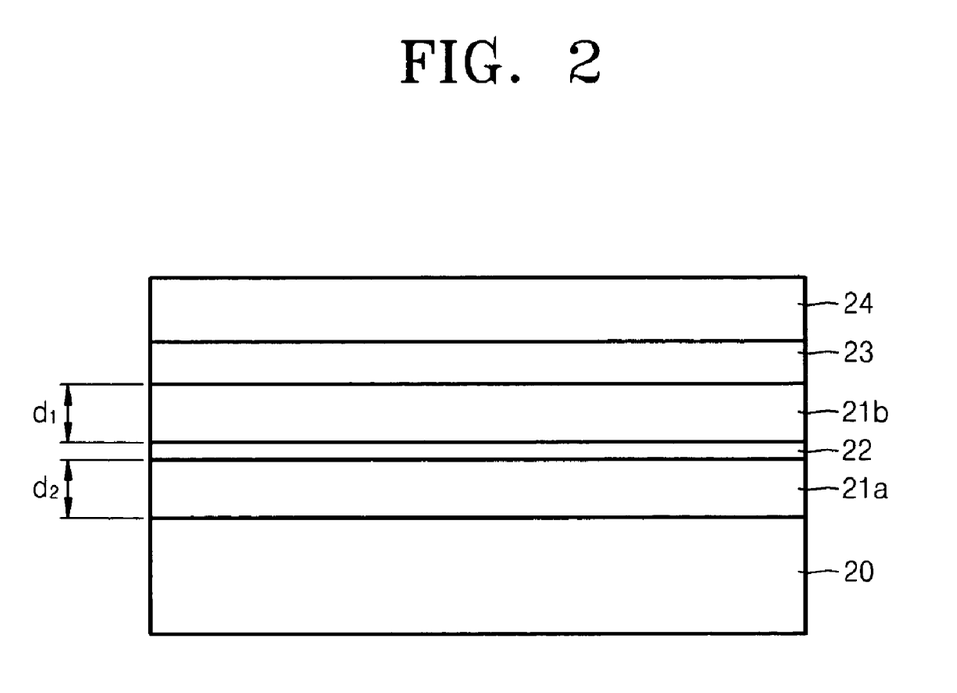
FIG. 2 is a cross-sectional view of a perpendicular magnetic recording medium according to an exemplary embodiment of the present invention.

Referring to FIG. 2, a perpendicular magnetic recording medium including a soft magnetic underlayer according to an exemplary embodiment of the present invention includes a lower structure 20, a first soft magnetic underlayer 21a, a non-magnetic layer 22 and a second soft magnetic underlayer 21b that are sequentially formed on the lower structure 20, an intermediate layer 23, and a recording layer 24. In addition, the perpendicular magnetic recording medium can further include a protecting layer and/or a lubricant layer (not shown) on the recording layer 24. According to the present exemplary embodiment, the lower structure 20 of the perpendicular magnetic recording medium includes a substrate, and a seed layer, a buffer layer, and an anti-ferromagnetic layer that are sequentially formed on the substrate.

The perpendicular magnetic recording medium includes the anti-ferromagnetic layer (not shown), a first soft magnetic underlayer 21a, and a second soft magnetic underlayer 21b under the recording layer 24. A ratio of a thickness d1 of the second soft magnetic underlayer 21b with respect to a sum of a thickness d2 of the first soft magnetic underlayer 21a and the thickness d1 of the second soft magnetic underlayer 21b, that is, the value of (d1/(d1+d2)), is 0.3~0.5. In addition, a ratio between $M_s t$ ($M_s$: saturation magnetization, t: thickness) of the first soft magnetic underlayer 21a and the second soft magnetic underlayer 21b, that is, $M_s t_{top}/M_s t_{bot}$, is 0.4~1.0. The perpendicular magnetic recording medium of the present invention can be fabricated using a general fabrication method of perpendicular magnetic recording medium, for example, using a sputtering method under a lower pressure.

The perpendicular magnetic recording medium including the soft magnetic underlayer according to an exemplary embodiment of the present invention will be described in detail as follows.

Figure 3A:
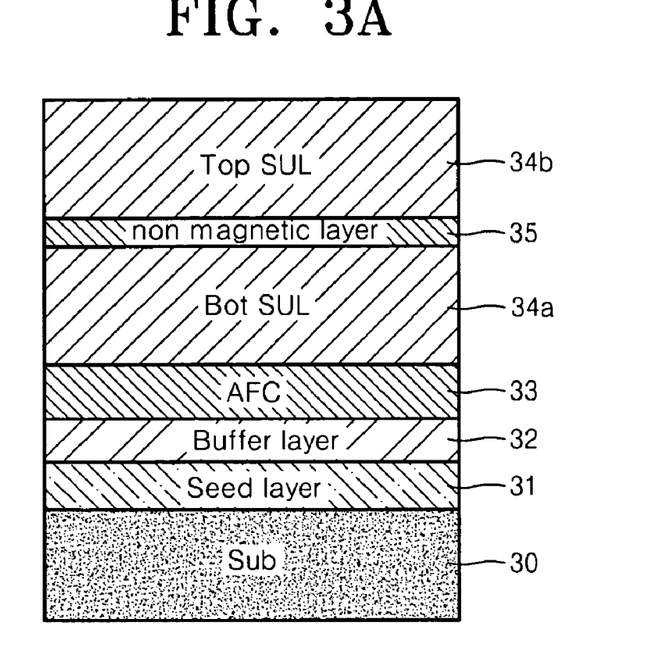
FIGS. 3A and 3B are cross-sectional views of detailed structures in the perpendicular magnetic recording medium of FIG. 2.

Referring to FIG. 3A, a seed layer 31, a buffer layer 32, and an anti-ferromagnetic layer 33 are sequentially formed on a substrate 30. In addition, a first soft magnetic underlayer 34a, a non-magnetic layer 35, and a second soft magnetic underlayer 34b are sequentially formed on the anti-ferromagnetic layer 33. Although it is not shown in FIG. 3A, a recording layer is formed on the second soft magnetic underlayer 34b, and an intermediate layer can be further formed between the second soft magnetic underlayer 34b and the recording layer in order to improve a crystalline orientation property and magnetic characteristics of the recording layer.

The substrate 30 can be formed of any material that can be used as a material of a general perpendicular magnetic recording medium, for example, glass. The seed layer 31 and the buffer layer 32 are provided to grow the soft magnetic underlayer. The seed layer 31 can be formed of Ta or Ta alloy, and the buffer layer 32 can be formed of a Ta/Ru compound, NiFe, or a NiFe-based alloy such as NiFeCr.

A plurality of layers representing characteristics of the soft magnetic underlayer are formed on the buffer layer 32. The anti-ferromagnetic layer 33 is formed on the buffer layer 32, which is formed of a magnetic material exhibiting the anti-ferromagnetic property, for example, IrMn. The anti-ferromagnetic layer 33 determines and fixes a magnetization direction of the first soft magnetic underlayer 34a that is formed thereon (pinning).

In a case where the anti-ferromagnetic layer 33 is formed of IrMn, an exchange bias magnetic field can be changed according to a thickness of the anti-ferromagnetic layer 33. When the thickness is approximately 10 nm, the exchange bias is relatively great. Thus, the IrMn anti-ferromagnetic layer 33 can have a thickness ranging from several nm to tens of nm, for example, a thickness within a range of 10 nm~20 nm.

The soft magnetic underlayer is formed on the anti-ferromagnetic layer 33 in a synthetic antiferromagnetic (SAF) structure. In more detail, the structure includes the first soft magnetic underlayer 34a, the non-magnetic layer 35, and the second soft magnetic underlayer 34b. When the first soft magnetic underlayer 34a is magnetized in a constant direction, the non-magnetic layer 35 induces the second soft magnetic underlayer 34b to be magnetized in the opposite direction to that of the first soft magnetic underlayer 34a.

The non-magnetic layer 35 can be formed of Cu, Ru, Rh, Re, Pd, or Pt, and is mainly formed of Ru. The non-magnetic layer 35 formed of Ru can have a thickness ranging from approximately several □ to several nm, for example, can have a thickness approximately of 0.8 nm, which is advantageous for inducing the anti-ferromagnetic coupling.

The first soft magnetic underlayer 34a and the second soft magnetic underlayer 34b can be formed of a variety of magnetic materials, for example, Co-based alloys such as CoZrNb and CoTaZr, or CoFe-based alloys such as CoFeB, CoFeNi, CoFeNiB, $Co_{90}Fe_{10}$, and $Co_{35}Fe_{65}$. The first soft magnetic underlayer 34a and the second soft magnetic underlayer 34b can have thicknesses ranging from several nm to tens of nm. In the perpendicular magnetic recording medium including the soft magnetic underlayer of the present exemplary embodiment, a sum of the thicknesses of the first soft magnetic underlayer 34a and the second soft magnetic underlayer 34b is 30 nm~80 nm.

Figure 3B:
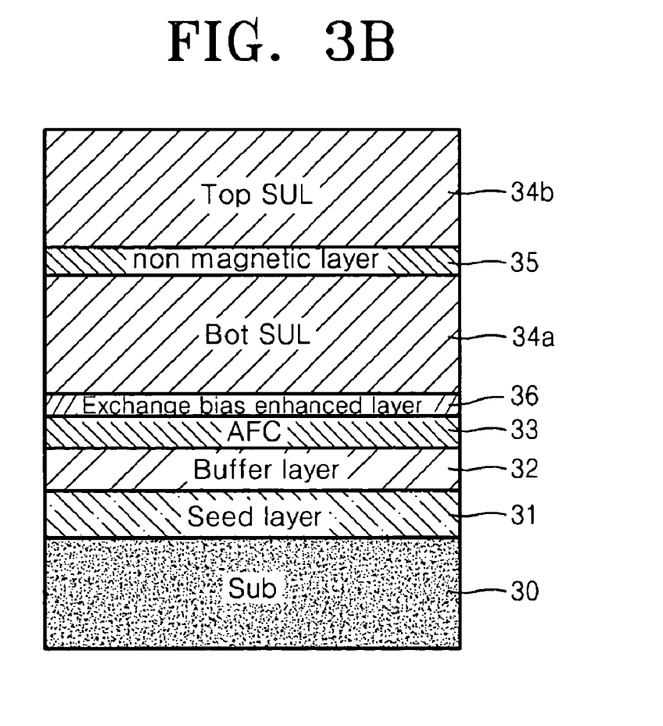

In FIG. 3B, an intermediate magnetic layer 36 is further formed between the anti-ferromagnetic layer 33 and the first soft magnetic underlayer 34a in the structure of FIG. 3A. The intermediate magnetic layer 36 is formed to reinforce the pinning effect of the magnetization direction of the first soft magnetic underlayer 34a by the anti-ferromagnetic layer 33. The intermediate magnetic layer 36 can be formed of a material having high Bs value, for example, CoFe or CoFeB to have a thickness of several nm.

Characteristics of the perpendicular magnetic recording medium including the soft magnetic underlayer according to the present exemplary embodiment will be described with reference to the accompanying drawings as follows.

Figure 4:
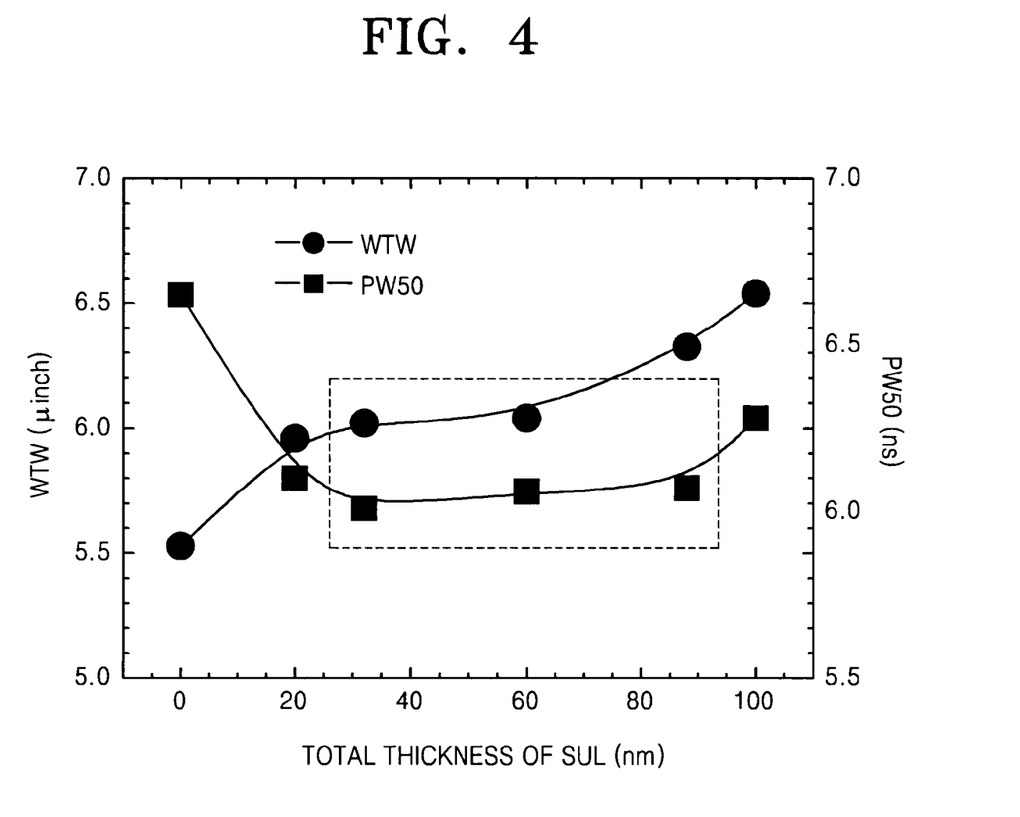
FIG. 4 is a diagram illustrating track widths according to a thickness of a soft magnetic underlayer.

FIG. 4 is a graph illustrating writing property of the perpendicular magnetic recording medium according to the thickness of the soft magnetic underlayer. A perpendicular magnetic recording medium having the structure of FIG. 3B was used as a sample, in which the lower structure were formed by applying Ta onto the glass substrate to a thickness of approximately 5 nm thickness as the seed layer 31, and applying NiFeCr on the seed layer 31 to about a thickness of approximately 5 nm thickness as the buffer layer 32. In addition, the IrMn anti-ferromagnetic layer 33 having a thickness of 10 nm was formed on the buffer layer 32, and the intermediate magnetic layer 36 was formed to a thickness of 2 nm using CoFeB. The first soft magnetic underlayer 34a and the second soft magnetic underlayer 34b were formed of CoZrNb, and the non-magnetic layer was formed between the first and second soft magnetic underlayers 34a and 34b to a thickness of approximately 0.8 nm using Ru. In addition, a Ta seed layer and a Ru intermediate layer were formed to a thickness of 3 nm and 30 nm, respectively, on the soft magnetic underlayer, and then, a CoCrPt—$SiO_2$ recording layer having a thickness of 15 nm was formed. Then, a hydrogenated C layer was formed to a thickness of 5 nm to protect the recording layer. At last, a lubricant layer was coated on the laminated structure, and recording/reproducing characteristics of the perpendicular magnetic recording medium was evaluated using a spin-stand.

Referring to FIG. 4, Write Track Width (WTW) is reduced as the sum of the thicknesses of the first soft magnetic underlayer 34a and the second soft magnetic underlayer 34b is reduced. In addition, a value of PW50 ns (Pulse Width 50: width of half of isolated transition pulse) shows stable low values when the sum of thicknesses of the first soft magnetic underlayer 34a and the second soft magnetic underlayer 34b ranges from approximately 30 nm to 80 nm. It may be advantageous that the values of WTW and PW50 are low in order to increase the writing density, and thus, the optimal thickness of the soft magnetic underlayer (sum of thicknesses of the first soft magnetic underlayer 34a and the second soft magnetic underlayer 34b) ranges from approximately 30 nm to 80 nm.

Figure 5A:
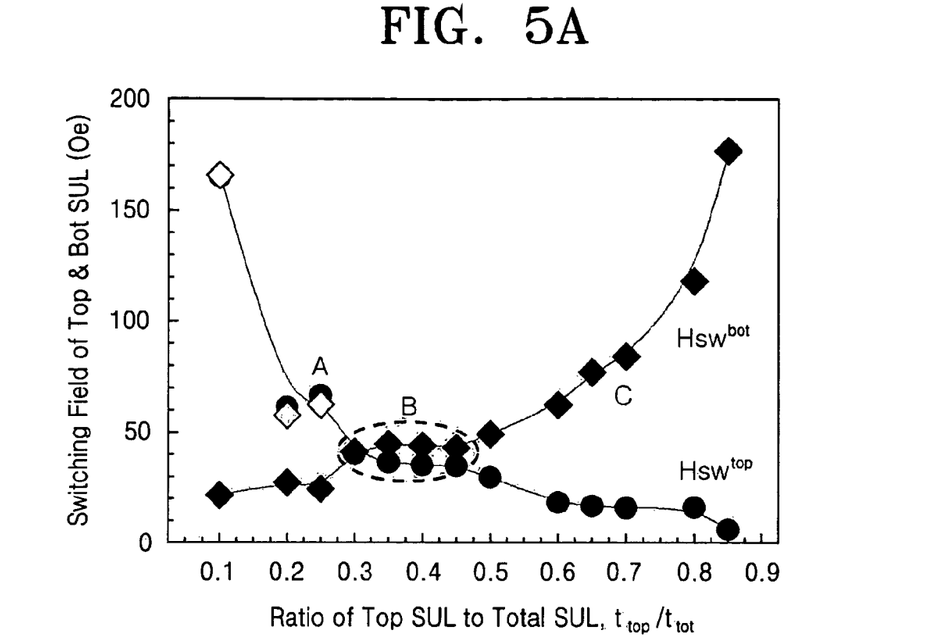
FIGS. 5A and 5B are graphs illustrating magnetic characteristics of the perpendicular magnetic recording medium including the soft magnetic underlayer according to the exemplary embodiment of the present invention.
Figure 5B:
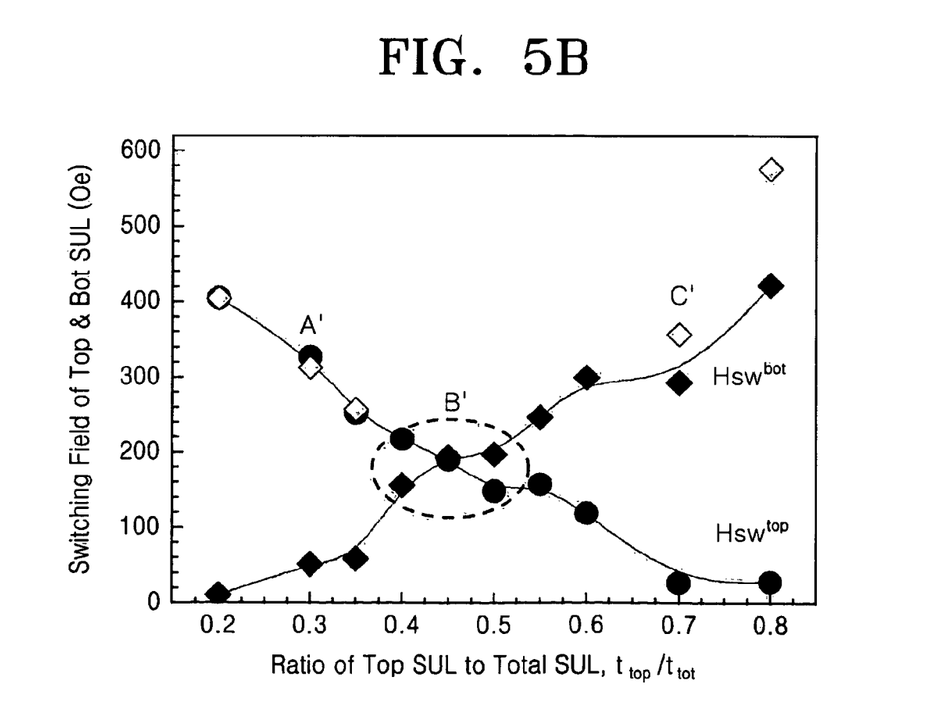

FIGS. 5A and 5B are graphs illustrating magnetic characteristics of the perpendicular magnetic recording medium including the soft magnetic underlayer according to the exemplary embodiment of the present invention. Here, horizontal axes of the graphs represent ratios of the thickness of the second soft magnetic underlayer to the entire thickness of the soft magnetic underlayer. In addition, vertical axes of the graphs respectively represent a switching field ($Hsw^{bot}$) of the first soft magnetic underlayer and a switching field ($Hsw^{top}$) of the second soft magnetic underlayer, and shows a permeability as a reference.

In FIG. 5A, the sum of thicknesses of the first and second soft magnetic underlayers in the same sample as that of FIG. 4 was set as 60 nm, and then, the thickness of the first soft magnetic underlayer was adjusted.

Referring to FIG. 5A, as the thickness of the first soft magnetic underlayer becomes thicker, that is, as the ratio of the horizontal axis is reduced, the switching field of the first soft magnetic underlayer is reduced. The same tendency occurs with respect to the second soft magnetic underlayer. However, the first soft magnetic underlayer has relatively larger switching field than that of the second soft magnetic underlayer due to the anti-ferromagnetic layer. The switching field should be considered in order to optimize the thickness ranges of the first soft magnetic underlayer and the second soft magnetic underlayer. If the magnetization direction of the soft magnetic underlayer is affected by an external and unexpected magnetic field such as a head or a voice coil motor (VCM), it may perform as noises to the data on the recording layer. Therefore, the lowest value of the switching field of the soft magnetic underlayer, that is, the first soft magnetic underlayer or the second soft magnetic underlayer, may be large. In FIG. 5A, the magnetic characteristic of region B is more preferable than those of region A and region C. Therefore, the thickness of the second soft magnetic underlayer may occupy 30%~50% of the entire thickness of the soft magnetic underlayer.

In FIG. 5B, a sample having the structure of FIG. 3A is used. In the lower structure of the sample, Ta is applied on the glass substrate to a thickness of approximately 5 nm as the seed layer 31, and NiFeCr is applied on the seed layer 31 to a thickness of approximately 5 nm to form the buffer layer 32. In addition, the IrMn anti-ferromagnetic layer 33 having a thickness of 10 nm is formed on the buffer layer 32, and the first and second soft magnetic underlayers 34a and 34b are formed of CoFeB. In addition, the non-magnetic layer 35 is formed to a thickness of 0.8 nm between the first and second soft magnetic underlayers 34a and 34b using Ru. In FIG. 5B, the horizontal axis represents a ratio of the first soft magnetic underlayer to the sum of the thicknesses of the first and second soft magnetic underlayers, which is set to be 40 nm.

Referring to FIG. 5B, as the thickness of the first soft magnetic underlayer becomes thicker, the switching field of the first soft magnetic underlayer is reduced, which is similar to the graph of FIG. 5A. In region B' of FIG. 5B, the lowest values of switching fields of the first and second soft magnetic underlayers are both larger than those in regions A' and C'. Consequently, the thickness of the second soft magnetic underlayer occupies 30%~60% of the entire thickness of the soft magnetic underlayer, and the second soft magnetic underlayer has the switching field of 50 Oe or larger.

From the results of FIGS. 5A and 5B, the optimal ratio of the second soft magnetic underlayer, that is, the upper soft magnetic underlayer, to the thickness of the entire soft magnetic underlayer ranges from 0.3 to 0.5.

Figure 6A:
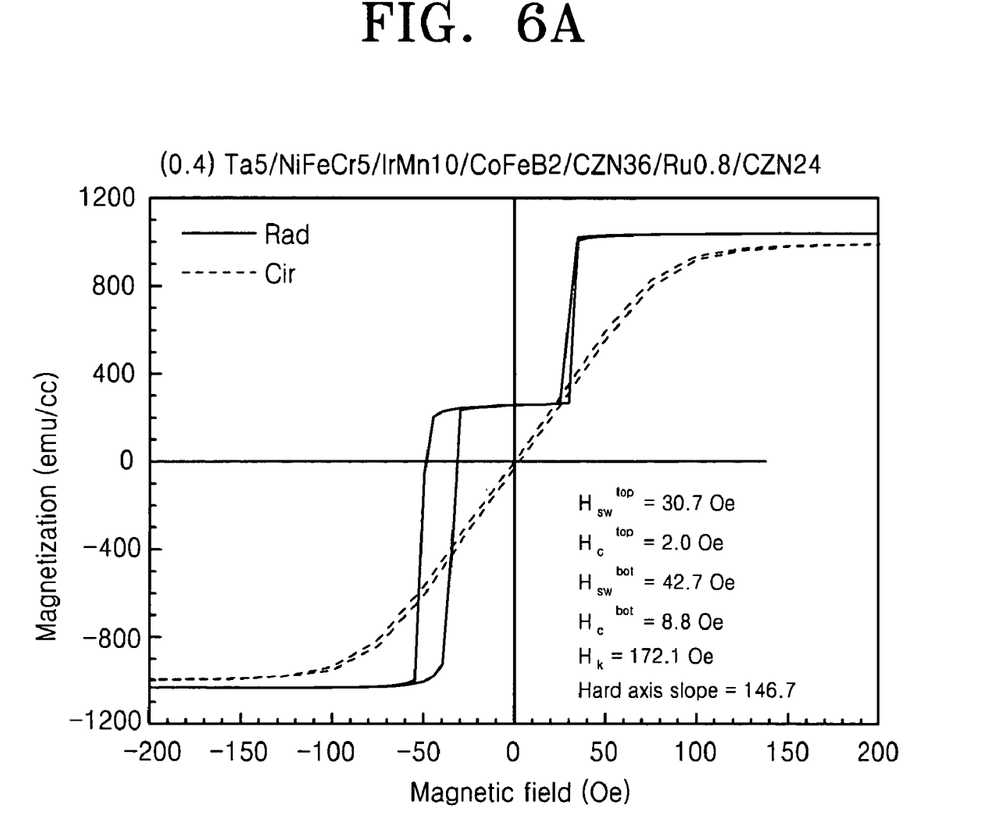
FIGS. 6A through 6B are graphs illustrating hysteresis characteristics of samples corresponding to regions B and C in FIG. 5A.
Figure 6B:
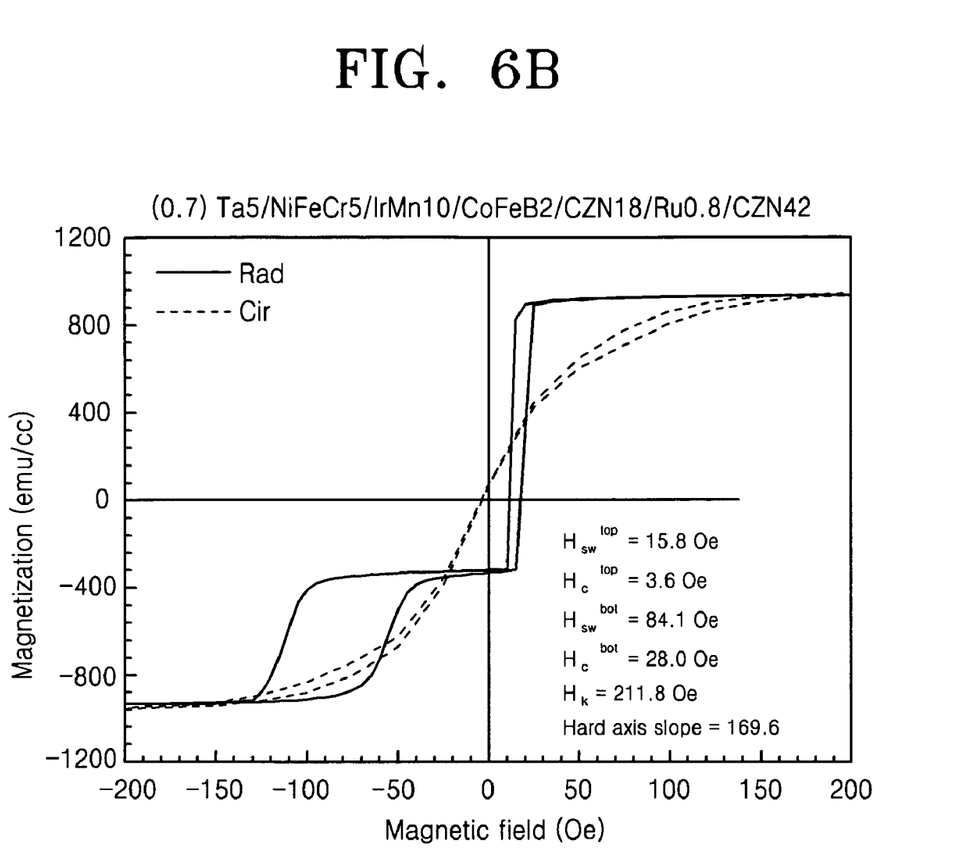

FIGS. 6A and 6B are graphs illustrating magnetic hysteresis characteristics of the samples in the regions B and C of FIG. 5A.

FIG. 6A is a graph illustrating a magnetic hysteresis curve of a sample in the region B of FIG. 5A, in which a ratio of the thickness of the second soft magnetic underlayer to the thickness of the entire soft magnetic underlayer is 0.4. In addition, FIG. 6B is a graph a magnetic hysteresis curve of a sample in the region C of FIG. 5A, in which a ratio of the thickness of the second soft magnetic underlayer to the thickness of the entire soft magnetic underlayer is 0.7. Referring to FIG. 6A, the first soft magnetic underlayer has a switching field of approximately 42.7 Oe, and the second soft magnetic underlayer has a switching field of approximately 30.7 Oe. Referring to FIG. 6B, the first soft magnetic underlayer has a switching field of approximately 84.1 Oe, and the second soft magnetic underlayer has a switching field of approximately 15.8 Oe.

In a case of the sample, in which the ratio of the thickness of the second soft magnetic underlayer to the thickness of the entire soft magnetic underlayer is 0.7, the switching field of the second soft magnetic underlayer is very low although the switching field of the first soft magnetic underlayer is large, and thus, the magnetization characteristics of the device may be degraded by the external magnetic field, and noise may occur. Therefore, the perpendicular magnetic recording medium, in which the ratio $t_{top}/t_{tot}$ is 0.4, will show the superior characteristics to those of the perpendicular magnetic recording medium, in which the ratio $t_{top}/t_{tot}$ is 0.7.

Figure 7A:
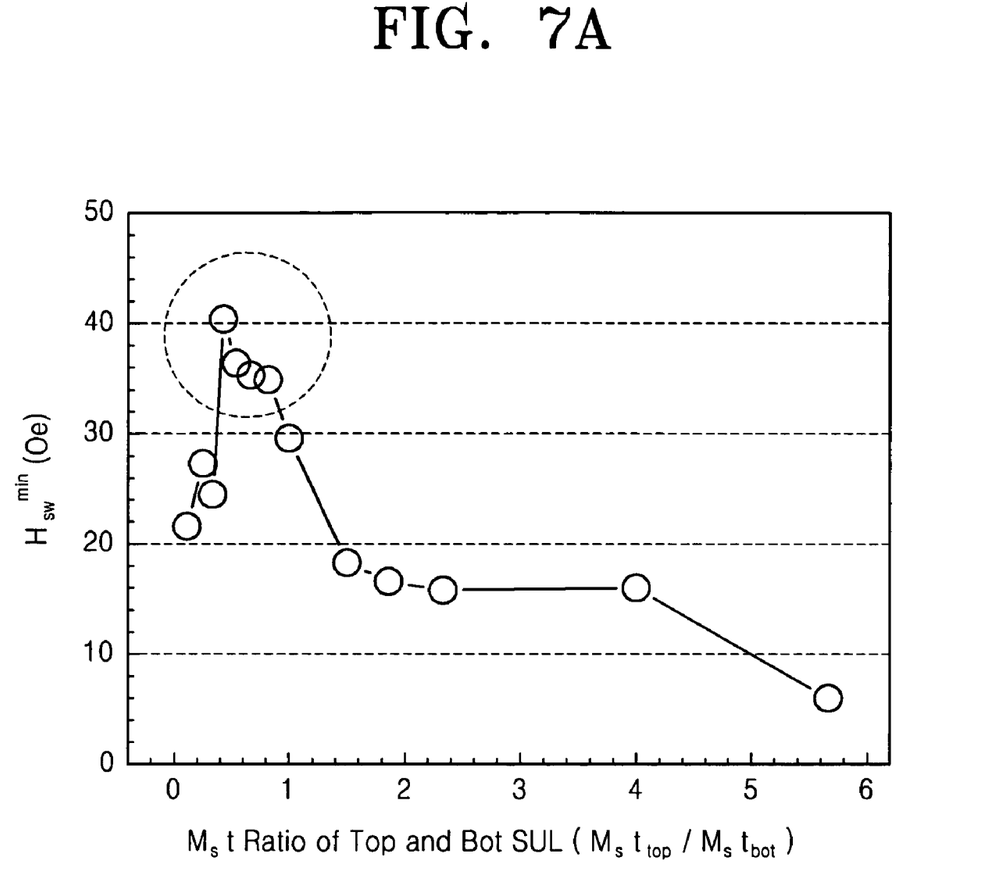
FIGS. 7A and 7B are experimental graphs illustrating relations between measured samples of FIG. 5A and switching fields in consideration of thicknesses of a first soft magnetic underlayer and a second soft magnetic underlayer and a saturation magnetization ($M_s$)
Figure 7B:
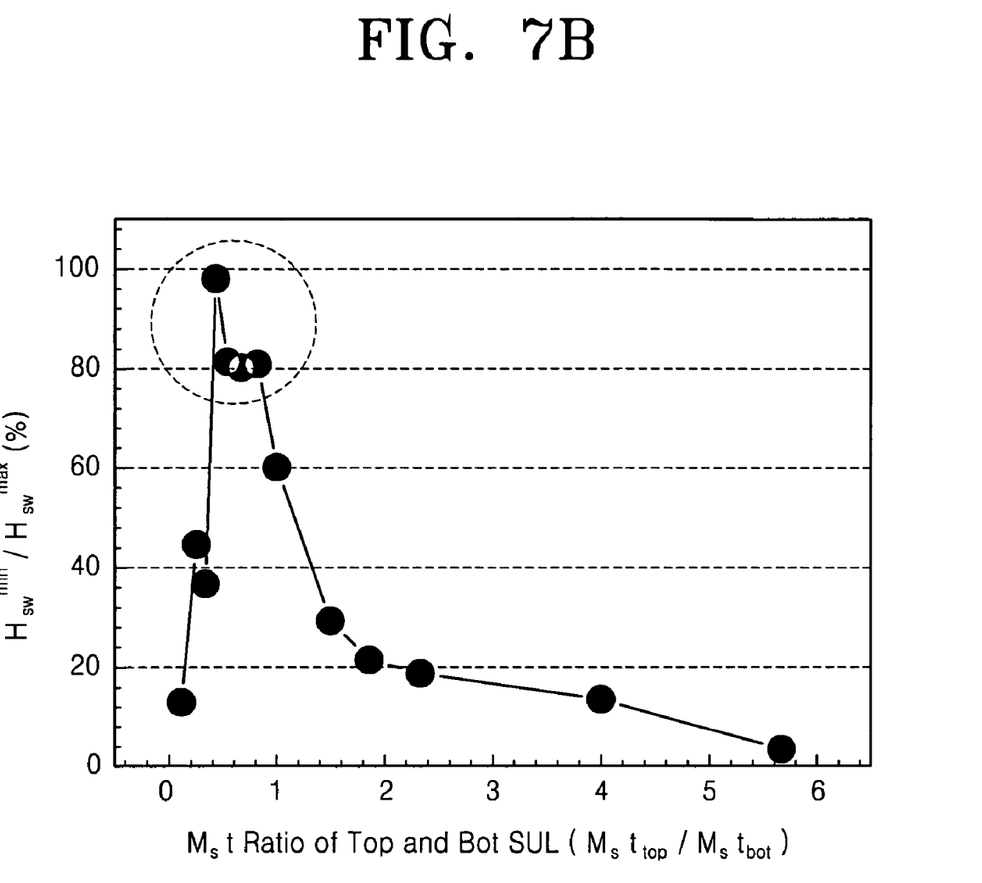

FIGS. 7A and 7B are graphs illustrating relations between thickness of the first and second soft magnetic underlayers multiplied with the saturation magnetization $M_s$ and the switching fields in the samples of FIG. 5A. Horizontal axes of FIGS. 7A and 7B represent $M_s t$ ratio between the first and second soft magnetic underlayer ($M_s t_{top}/M_s t_{bot}$), and vertical axes of FIGS. 7A and 7B respectively represent the lowest value of the switching field ($Hsw^{min}$), and a ratio of the lowest value of the switching field to the highest value of the switching field ($Hsw^{min}/Hsw^{max}$).

Referring to FIGS. 7A and 7B, the lowest value of the switching field is approximately 30 Oe or greater within a range where the $M_s t$ ratio of the second soft magnetic underlayer to the $M_s t$ of the first soft magnetic underlayer ($M_s t_{top}/M_s t_{bot}$) is 0.3 through 1.0. In addition, in the above range, the ratio of the lowest value of the switching field to the highest value of the switching field ($Hsw^{min}/Hsw^{max}$) is approximately 50% or greater, and in particular, the ratio ($Hsw^{min}/Hsw^{max}$) is approximately 80% or greater within the range where the ratio ($M_s t_{top}/M_s t_{bot}$) is 0.4 through 0.8 (the region denoted by dotted line).

Figure 8A:
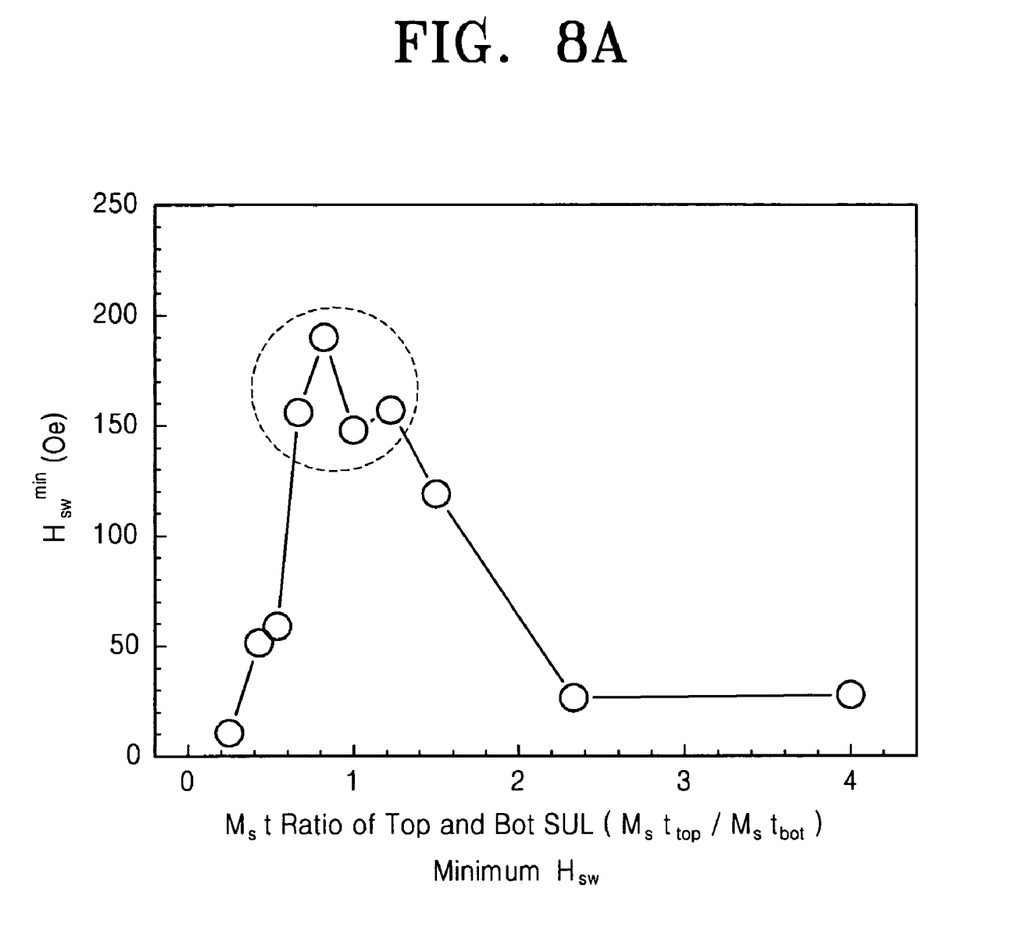
FIGS. 8A and 8B are experimental graphs illustrating relations between measured samples of FIG. 5B and switching fields in consideration of thicknesses of a first soft magnetic underlayer and a second soft magnetic underlayer and a saturation magnetization ($M_s$).
Figure 8B:
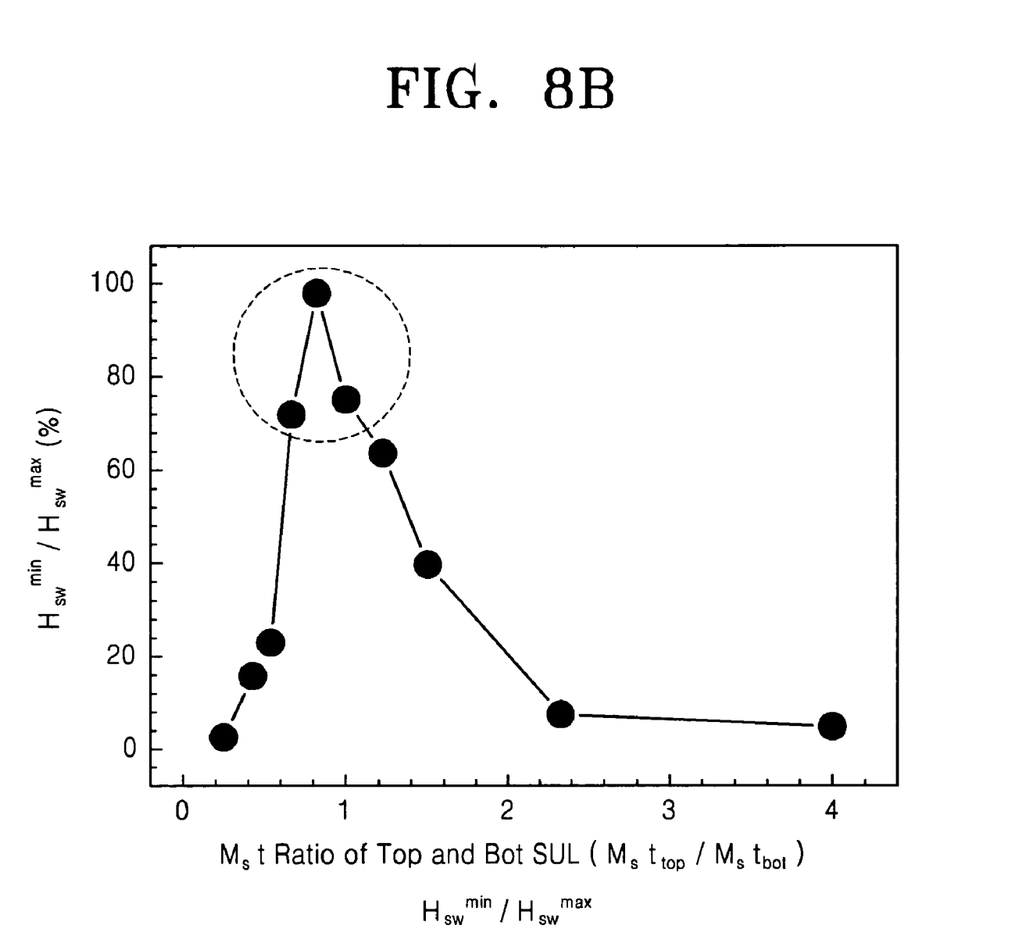

FIGS. 8A and 8B are graphs illustrating relations between thickness of the first and second soft magnetic underlayers multiplied with the saturation magnetization $M_s$ and the switching fields in the samples of FIG. 5B.

Referring to FIGS. 8A and 8B, the lowest value of the switching field is approximately 50 Oe or greater within a range where the $M_s t$ ratio of the second soft magnetic underlayer to the $M_s t$ of the first soft magnetic underlayer ($M_s t_{top}/M_s t_{bot}$) is 0.4 through 1.4. In addition, in the above range, the ratio of the lowest value of the switching field to the highest value of the switching field ($Hsw^{min}/Hsw^{max}$) is approximately 20% or greater. In particular, the ratio ($Hsw^{min}/Hsw^{max}$) is approximately 70% or greater within the range where the ratio ($M_s t_{top}/M_s t_{bot}$) is 0.6 through 1.0 (the region denoted by dotted line).

That is, referring to the results of the graphs in FIGS. 7A, 7B, 8A, and 8B, the perpendicular magnetic recording medium can show the optimal performance when the ratio ($M_s t_{top}/M_s t_{bot}$) ranges from 0.4 to 1.0. In more detail, if the soft magnetic underlayer formed of a material, $M_s$ value of which is 1000~1500 emu/cc, for example, CoZrNb, the value of the ratio ($M_s t_{top}/M_s t_{bot}$) may range from 0.4 to 0.8. In addition, if the soft magnetic underlayer formed of a material, $M_s$ value of which is 1600~2000 emu/cc, for example, CoFeB, the value of the ratio ($M_s t_{top}/M_s t_{bot}$) may range from 0.6 to 1.0.

According to the perpendicular magnetic recording medium of the present invention, since the soft magnetic underlayer includes multiple layers and the magnetization direction of the lower soft magnetic layer is maintained using the anti-ferromagnetic layer, the affects of the external magnetic field generated by the magnetic head and the VCM can be minimized, and thus, the creation of noise can be suppressed.

Since the thicknesses of multiple layers in the soft magnetic underlayer are adjusted within optimal ranges, the lowest value of the switching field can be increased, and thus, the suppression of the noise generation can be maximized.

In addition, since the saturation magnetization value is further considered, the present invention can be applied to a variety of materials forming the soft magnetic underlayer.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A perpendicular magnetic recording medium comprising:
   an anti-ferromagnetic layer;
   a first soft magnetic underlayer formed on the anti-ferromagnetic layer;
   a non-magnetic layer formed on the first soft magnetic underlayer;
   a second soft magnetic underlayer formed on the non-magnetic layer; and
   a recording layer formed on the second soft magnetic underlayer,
   wherein the second soft magnetic underlayer is magnetized in a direction opposite to a direction along which the first soft magnetic underlayer is magnetized, and
   wherein a ratio of $M_s t$ of the second soft magnetic underlayer to $M_s t$ of the first soft magnetic underlayer is approximately 0.4 to 0.8, where $M_s$ is a saturation magnetization value, t is a thickness value, and $M_s$ of a material forming the first soft magnetic underlayer or the second soft magnetic underlayer is approximately 1000 to 1500 emu/cc.

2. The perpendicular magnetic recording medium of claim 1, wherein a thickness of the second soft magnetic underlayer is approximately 30% through 50% of a sum of a thickness of the first soft magnetic underlayer and the thickness of the second soft magnetic underlayer.

3. The perpendicular magnetic recording medium of claim 2, wherein the sum of the thickness of the first soft magnetic underlayer and the thickness of the second soft magnetic underlayer is approximately 30 nm to 80 nm.

4. The perpendicular magnetic recording medium of claim 1, further comprising:
   a substrate;
   a seed layer formed on the substrate; and
   a buffer layer formed on the seed layer,
   wherein the anti-ferromagnetic layer is formed on the buffer layer.

5. The perpendicular magnetic recording medium of claim 1, wherein the non-magnetic layer comprises at least one of Cu, Ru, Rh, Re, Pd, and Pt.

6. The perpendicular magnetic recording medium of claim 1, wherein the first soft magnetic underlayer or the second soft magnetic underlayer is formed of CoZrNb, CoTaZr, CoFeB, CoFeNi, CoFeNiB, $Co_{90}Fe_{10}$, or $Co_{35}Fe_{65}$.

7. The perpendicular magnetic recording medium of claim 1, further comprising:
   an intermediate magnetic layer formed between the anti-ferromagnetic layer and the first soft magnetic underlayer.

8. The perpendicular magnetic recording medium of claim 1, wherein a sum of a thickness of the first soft magnetic underlayer and a thickness of the second soft magnetic underlayer is approximately 30 nm to 80 nm.

9. The perpendicular magnetic recording medium of claim 8, further comprising:
   a substrate;
   a seed layer formed on the substrate; and
   a buffer layer formed on the seed layer,
   wherein the anti-ferromagnetic layer is formed on the buffer layer.

10. The perpendicular magnetic recording medium of claim 1, wherein the second soft magnetic underlayer is thinner than the first soft magnetic underlayer.

* * * * *